US007787018B2

(12) United States Patent  (10) Patent No.: US 7,787,018 B2
Hatanaka et al.  (45) Date of Patent: Aug. 31, 2010

(54) APPARATUS AND METHOD FOR SHAKE DETECTION, AND IMAGING DEVICE

(75) Inventors: Haruo Hatanaka, Moriguchi (JP); Shinpei Fukumoto, Moriguchi (JP); Hideto Fujita, Moriguchi (JP); Haruhiko Murata, Moriguchi (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 461 days.

(21) Appl. No.: 11/949,239

(22) Filed: Dec. 3, 2007

(65) Prior Publication Data

US 2008/0136926 A1 Jun. 12, 2008

(30) Foreign Application Priority Data

Dec. 6, 2006 (JP) ............................. 2006-329636

(51) Int. Cl.
*H04N 5/228* (2006.01)
(52) U.S. Cl. .................................... 348/208.2; 396/52
(58) Field of Classification Search .................. None
See application file for complete search history.

(56) References Cited

U.S. PATENT DOCUMENTS

| 5,534,967 | A | * | 7/1996 | Matsuzawa | ................ | 396/55 |
| 5,583,597 | A | | 12/1996 | Enomoto | | |
| 5,617,176 | A | * | 4/1997 | Matsuzawa et al. | ........... | 396/55 |
| 5,805,212 | A | * | 9/1998 | Fujiwara | ................ | 348/208.8 |
| 6,801,247 | B1 | * | 10/2004 | Ohishi et al. | ........... | 348/208.1 |
| 2005/0254805 | A1 | * | 11/2005 | Moriya et al. | ................ | 396/53 |

FOREIGN PATENT DOCUMENTS

| JP | 60-143330 | | 7/1985 |
| JP | 07-110504 | A | 4/1995 |
| JP | 07-253604 | | 10/1995 |
| JP | 07-263604 | A | 10/1995 |
| JP | 07286852 | A * | 10/1995 |
| JP | 07-301836 | A | 11/1995 |
| JP | 08-082821 | | 3/1996 |
| JP | 08-082821 | A | 3/1996 |

* cited by examiner

*Primary Examiner*—Jason Chan
*Assistant Examiner*—Dennis Hogue
(74) *Attorney, Agent, or Firm*—Marvin A. Motsenbocker; Mots Law, PLLC

(57) ABSTRACT

An amplification signal of a difference signal between a sensor signal and an offset signal to be variably set is converted into a digital signal. The sensor signal is in accordance with shake of an imaging device and outputted from a sensor. The first digital signal is obtained while a conversion ratio between the difference signal and the digital signal is set to a first conversion ratio. The second digital signal is obtained while the conversion ratio is set to a second conversion ratio. In relation to a certain difference signal, the value of the second digital signal is smaller than that of the first signal. The offset signal is updated based on the second digital signal. The shake information is generated based on the first digital signal.

13 Claims, 11 Drawing Sheets

HIGH AMPLIFICATION FACTOR WITHOUT OFFSET ADJUSTMENT

LOW AMPLIFICATION FACTOR WITHOUT OFFSET ADJUSTMENT

HIGH AMPLIFICATION FACTOR WITH OFFSET ADJUSTMENT

AFTER COARSE
OFFSET ADJUSTMENT

STABLE PERIOD   STABLE PERIOD

AFTER FINE
OFFSET ADJUSTMENT

APPARATUS AND METHOD FOR SHAKE DETECTION, AND IMAGING DEVICE

CROSS REFERENCE TO RELATED APPLICATIONS

This application claims priority based on 35 USC 119 from prior Japanese Patent Application No. P2006-329636 filed on Dec. 6, 2006, the entire contents of which are incorporated herein by reference.

BACKGROUND OF THE INVENTION

1. Field of the Invention

The present invention relates to a shake detecting apparatus and a shake detecting method for detecting shake of an imaging device. The invention relates more particularly to an imaging device provided with such a shake detecting apparatus.

2. Description of Related Art

Camera-shake correction technology reduces camera shake at the time of capturing an image, and is increasingly important as a differentiating technology for an imaging device such as a digital still camera. Irrespective of whether a correction object is a still image or a moving image, camera-shake correction technology may include two technologies: one for detecting camera shake; and the other for correcting an image on the basis of the detection result.

Camera-shake detecting methods can include: a method in which a camera-shake detection sensor is used; and an electronic method in which an image is analyzed and thereby camera-shake is detected. The image correction method can include: an optical camera-shake correction in which correction is performed by driving an optical system; and an electronic camera-shake correction in which correction is performed processing of an image.

The camera-shake correction methods for still images include: a method in which camera shake is detected by a camera-shake detection sensor, and camera-shake correction is optically performed on the basis of the detection result; a method in which camera shake is detected by a camera-shake detection sensor, and camera-shake correction is electronically performed on the basis of the detection result; and a method in which an image is analyzed to detect camera shake, and camera-shake correction is electronically performed on the basis of the detection result.

Heretofore, an angular velocity sensor and an acceleration sensor have been used as camera-shake detection sensors. Meanwhile, to reduce the size of an imaging device, efforts are made to reduce the size of the sensors is also in progress. A temperature change in the use environment and a temperature increase due to the use of a sensor element itself influence an offset component of the camera-shake detection sensor and a drift thereof. The reduction in the size of a camera-shake detecting unit including the camera-shake detection sensor causes the above influence to be more pronounced. As a result, there is a problem of the deterioration in the accuracy of camera-shake detection. In particular, a camera-shake detecting unit configured by a piezoelectric element has been proposed to be reduced in size; nevertheless, a large drift occurs in the camera-shake detecting unit due to the change in a capacitance related to the detection in addition to the deformation of the element shape, caused by the temperature change. This drift (the offset component due to the drift) may become dozens of times as large as the camera-shake component to be detected.

Meanwhile, the angular velocity sensor and the acceleration sensor themselves output sensor signals only with very small voltages in response to given camera shake, so that it is necessary to provide a suitable amplifier to a subsequent stage of the sensors. Furthermore, in general, by providing an A/D converter to a subsequent stage of this amplifier, camera shake is detected as a digital signal. Accordingly, when a sensor signal containing an offset component, which drifts, is amplified as it stands, the offset component (drift component) is also amplified. As a result, the output from the A/D converter in the subsequent stage is saturated. To avoid this saturation, when an amplification factor of the amplifier is reduced, or when an input voltage range of the A/D converter are increased, camera-shake detection sensitivity is reduced, and consequently camera-shake detection accuracy deteriorates.

In view of the above-described problems, Japanese Laid-open Patent Application Publication No. Sho 60-143330, has proposed a method in which a high pass filter (HPF) is used for outputting a signal from an angular velocity sensor in order to remove only a drift component having a low frequency compared to that of a hand-shake component.

Moreover, Japanese Patent Application Laid-open Publication No. Hei 7-253604 and Japanese Patent Application Laid-open Publication No. Hei 8-82821 have proposed methods to avoid output saturation of the A/D converter by: adopting a configuration in which a signal is obtained by amplifying a difference between an output signal from an angular velocity sensor and a reference voltage, and the obtained signal is converted from analog into digital signal; and thereafter raising or lowering the reference voltage by a predetermined voltage while a saturation state after the A/D conversion is checked.

However, in the method of Japanese Unexamined Patent Application Publication No. Sho 60-143330, there is a problem that, when the cutoff frequency of the HPF is increased, a camera-shake component is also removed. In contrast, when the cutoff frequency is reduced, the time constant of the signal increases. As a result, a long stable period is required to remove the remaining signal component which cannot be separated from the camera-shake signal component. In other words, to obtain desired camera-shake detection accuracy, the imaging device needs to stay still for a long period of time before capturing an image.

Furthermore, in the methods of Japanese Unexamined Patent Application Publication No. Hei 7-253604 and Japanese Patent Application Laid-open Publication No. Hei 8-82821, when an influence of the drift is large, the reference voltage needs to be raised or lowered a large number of times until there is no output saturation, and as a result, it takes a long time for adjustment. In addition, against a small drift not exceeding the saturation level, which occurs after the adjustment, it has been proposed that an HPF is used. However, the use of HPF causes the same problem as that of Japanese Unexamined Patent Application Publication No. Sho 60-143330.

SUMMARY OF THE INVENTION

The present invention is to provide a shake detecting apparatus and a shake detecting method in which an offset component of a sensor, which is in an output of an A/D conversion, can be quickly reduced. Additionally, the present invention is to provide an imaging device provided with such a shake detecting apparatus.

An aspect of the invention provides a shake detecting apparatus that comprises: an amplifying unit for amplifying a difference signal between an offset signal and a sensor signal in accordance with shake of an imaging device, the amplifying unit amplifying the difference signal, on the basis of a amplification factor signal, in any mode of a first amplification factor mode in which the difference signal is amplified at a first amplification factor, and a second amplification factor mode in which the difference signal is amplified at a second amplification factor smaller than the first amplification factor, and the amplifying unit outputting the difference signal thus amplified; an A/D converter for converting the output signal from the amplifying unit into a digital signal; a shake-information generating unit for generating shake information representing the shake of the imaging device on the basis of the digital signal; a controller for receiving the digital signal, for variably setting an offset signal on the basis of this digital signal, and for generating the amplification factor signal; an offset outputting unit for outputting the offset signal set by the controller; and a D/A converter for converting the offset signal outputted from the offset outputting unit into an analog signal, and for outputting the analog signal to the amplifying unit, wherein the controller updates the offset signal on the basis of the digital signal obtained in the second mode, and generates the shake information on the basis of the digital signal obtained in the first mode.

By updating the offset signal on the basis of the digital signal obtained in the second mode, it is possible to reduce an offset component of a sensor, which is contained in the digital signal, in a short time. As a result, it becomes possible to avoid an output saturation of A/D conversion means without deteriorating shake detection accuracy.

Moreover, it becomes possible to stably reduce an offset component.

Furthermore, it also becomes possible to reduce an offset component with higher accuracy, and consequently to perform shake detection with higher accuracy.

Still furthermore, when higher detection accuracy is required, it is possible to perform shake detection with higher accuracy.

DETAILED DESCRIPTION OF EMBODIMENTS

Figure 1:
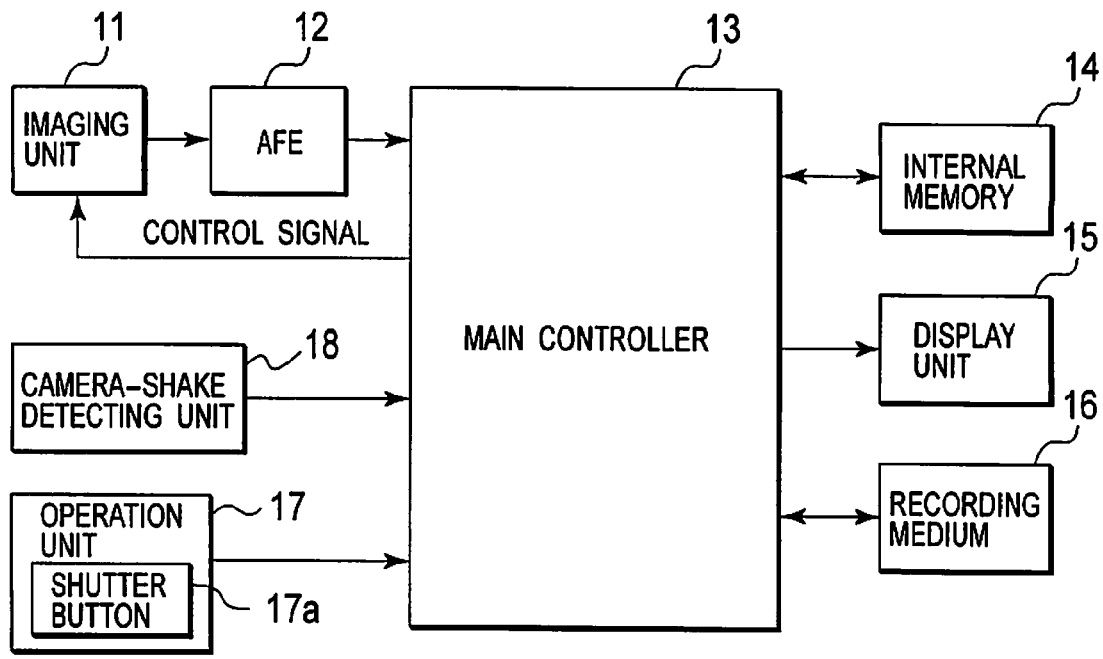
FIG. 1 is a block diagram of an entire imaging device according to an embodiment.

Embodiments of the invention will be specifically described below with reference to the accompanying drawings. In the following drawings, the same reference numerals and symbols are used to designate the same components, and so basically the repetition of the description on the same or similar components will be omitted.

Common subject matters in the embodiments and points to be referred in the embodiments will be first described while first to fourth embodiments are described later. Furthermore, in the embodiments, an imaging device simply means that the imaging device according to each embodiment. The imaging device is a digital still camera capable of capturing still images, or a digital video camera capable of capturing still and moving images.

First of all, the entire configuration of an imaging device will be described in a simple manner. The imaging device includes imaging unit 11, AFE (Analog Front End) 12, main controller 13, internal memory 14, display unit 15, recording medium 16, operation unit 17 and camera-shake detecting unit 18.

Figure 2:
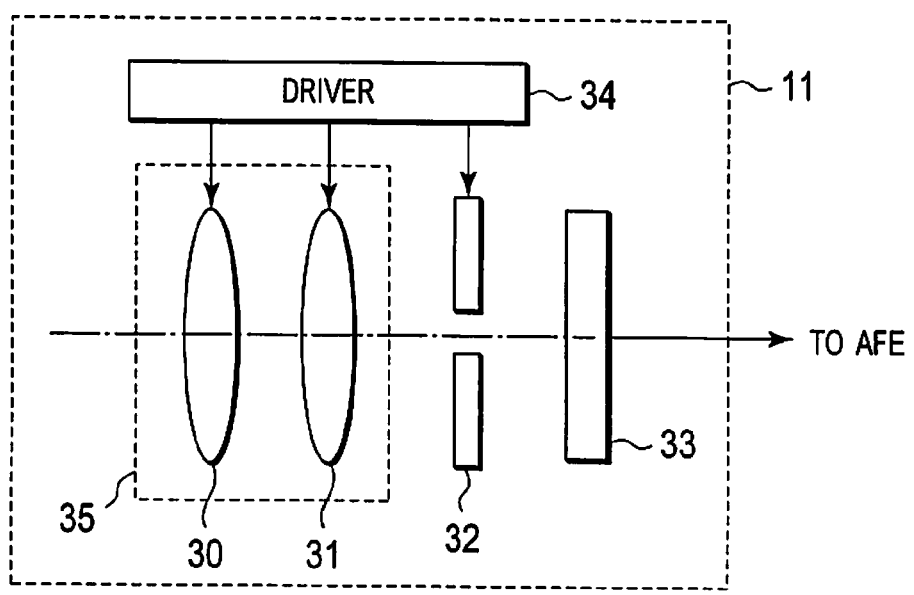
FIG. 2 is a view of an internal configuration of an imaging unit in FIG. 1.

FIG. 2 is a view for showing an internal configuration of imaging unit 11. Imaging unit 11 includes optical system 35, aperture 32, imaging element 33 and driver 34. The optical system 35 is configured with a plurality of lenses including zoom lens 30 and focus lens 31. Zoom lens 30 and focus lens 31 are capable of moving in a direction of an optical axis.

Driver 34 configured by a motor and the like controls the movement of zoom lens 30 and focus lens 31 on the basis of a control signal from main controller 13, thereby controlling the zoom factor and the focal length of optical system 35. In addition, driver 34 controls the degree of opening (the size of the opening) of aperture 32 according to the control signal from main controller 13, and controls a zoom magnification and a focal length of optical system 35.

An incident light from a subject enters imaging element 33 through the lenses constituting optical system 35, and through aperture 32. The lenses constituting optical system 35 form an optical image of the subject on imaging element 33. Imaging element 33 includes, for example, a charge coupled device (CCD) image sensor and a complementary metal oxide semiconductor (CMOS) image sensor. Imaging element 33 photoelectrically converts the optical image, which has entered through optical system 35 and aperture 32, into an electric signal, and then outputs, to AFE 12, the electric signal obtained through the photoelectric conversion.

AFE 12 amplifies an analogue signal outputted from imaging unit 11 (imaging element 33), and then converts the amplified analogue signal into a digital signal. AFE 12 sequentially outputs the digital signals to main controller 13.

Main controller 13 includes a CPU (Central Processing Unit), a ROM (Read Only Memory), a RAM (Random Access Memory), and the like, and also serves as a video signal processing unit. Main controller 13 generates an image signal representing an image (hereinafter also referred to as "captured image") captured by imaging unit 11, on the basis of the output signal from AFE 12.

Internal memory 14 temporarily stores various data generated in the imaging device. Display unit 15 is configured from a liquid crystal display panel and the like. While control of main controller 13, display unit 15 displays an image captured in an immediately preceding frame, and an image recorded in recording medium 16. Recording medium 16 is a nonvolatile memory such as an SD (Secure Digital) memory card, and stores a captured image under control of main controller 13. Operation unit 17 includes shutter button 17a and the like, and is operated from outside. Operation contents to operation unit 17 are transmitted to main controller 13. Shutter button 17a is for instructing the capturing of a still image.

Camera-shake detecting unit 18 includes two angular velocity sensors 19 and 20, and detects so-called camera shake. Angular velocity sensor 19 detects an angular velocity in a pan direction (horizontal direction) of the imaging device. Angular velocity sensor 20 detects an angular velocity in a tilt direction (vertical direction) thereof. The pan direction and the tilt direction are perpendicular to each other, and also perpendicular to an optical axis. The pan direction corresponds to a horizontal direction of an image, while the tilt direction corresponds to a vertical direction thereof.

Angular velocity sensor 19 measures an angular velocity in the pan direction at predetermined sampling interval dt, and outputs an analog signal indicating the angular velocity in the pan direction measured at the sampling interval dt. Angular velocity sensor 20 measures an angular velocity in the tilt direction at predetermined sampling interval dt, and outputs an analog signal indicating the angular velocity in the tilt direction measured at the sampling interval dt.

Camera shake is detected (the direction and magnitude of camera shake are detected) and corrected on the basis of the outputted signals from angular velocity sensors 19 and 20. The imaging device according to the present embodiment is characterized by a camera-shake detecting method using camera-shake detecting unit 18. Embodiments of this camera-shake detecting method, are cited as the first to fourth examples below. Points described in one of the embodiments are applicable to the other embodiments, as long as no contradiction occurs.

Figure 3:
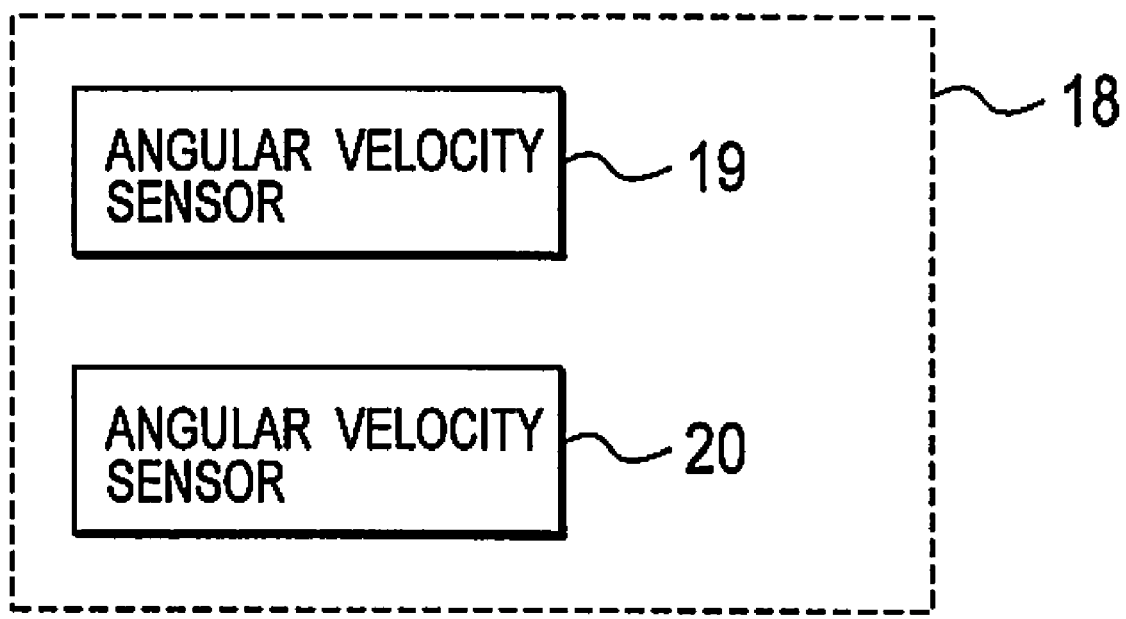
FIG. 3 is a view of an internal configuration of a camera-shake detecting unit in FIG. 1.

Camera-shake detecting unit 18 shown in FIG. 3 includes two detecting units: one having angular velocity sensor 19 so as to detect an angular velocity in the pan direction; and the other having angular velocity sensor 20 so as to detect an angular velocity in the tilt direction. Since the detecting units have the same configurations and operations, the configuration and operation of the former detecting unit will be described in each embodiment, and a description of the latter detecting unit is omitted.

Furthermore, the above-described analog signal, which is sequentially outputted from angular velocity sensor 19 at sampling interval dt, is hereinafter referred to as a "sensor signal." The magnitude of voltage of the sensor signal from angular velocity sensor 19 is proportional to an angular velocity in the pan direction of the imaging device. If an offset component of the output signal from angular velocity sensor 19 is neglected, in the instance where the angular velocity is zero, the voltage value of the sensor signal also becomes zero. Furthermore, the sensor signal takes a positive or negative voltage value in response to the direction of the angular velocity. For example, when the angular velocity is in the left-hand direction, a sensor signal of positive voltage is outputted. When the angular velocity is in the right-hand direction, a sensor signal of negative voltage is outputted. Incidentally, in each embodiment, analog voltage signals are used as the analog signals.

First Embodiment

Figure 4:
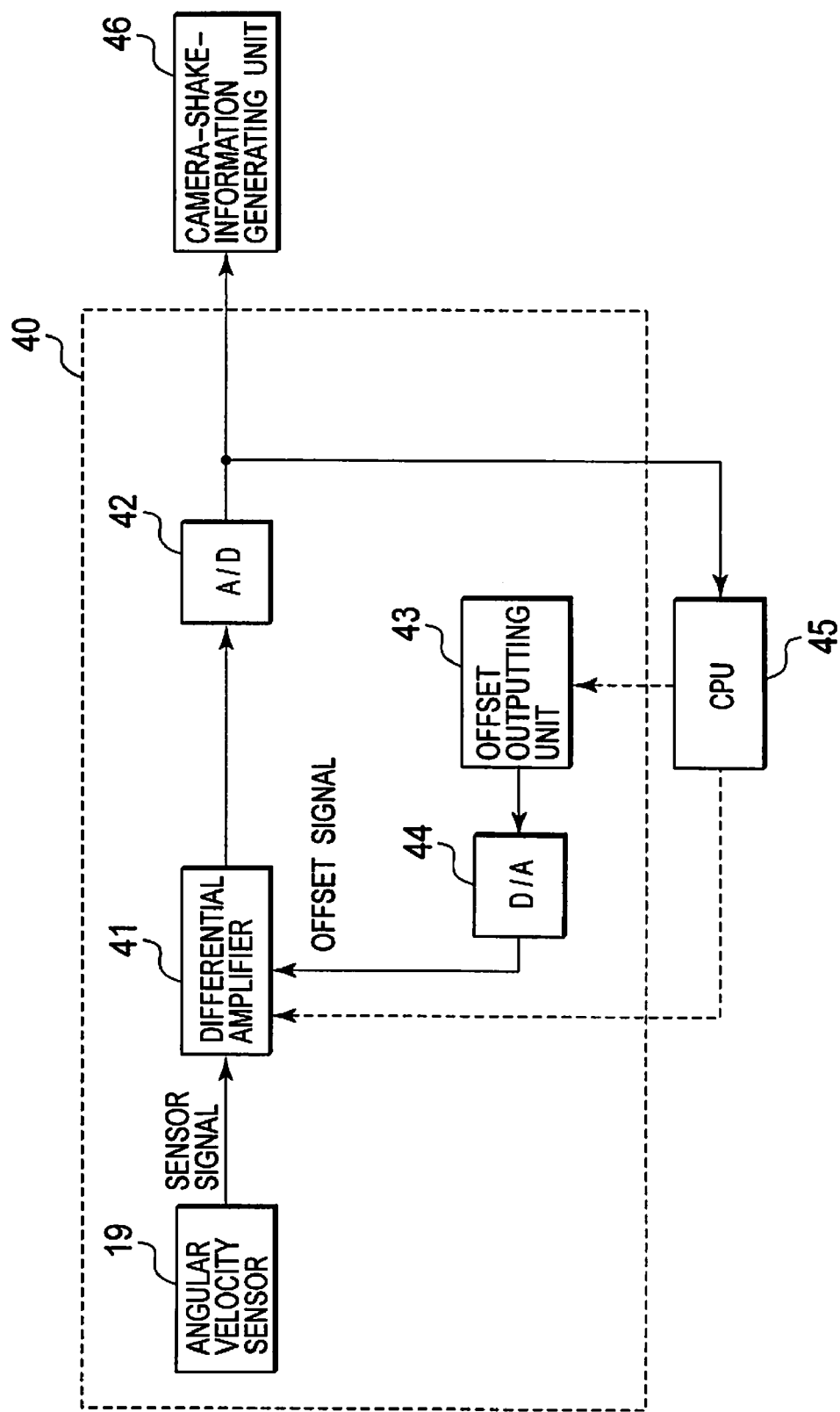
FIG. 4 is a block diagram of a portion involved in camera-shake detection according to a first embodiment.

Firstly, a first embodiment will be described. FIG. 4 is a block diagram of a portion involved in camera-shake detection according to the first embodiment. Detection unit 40 shown in FIG. 4 is a detecting unit which is provided to camera-shake detecting unit 18 in FIG. 1, and which detects an angular velocity in the pan direction. CPU 45 and camera-shake-information generating unit 46 shown in FIG. 4 are provided to main controller 13, for example.

Detection unit 40 includes angular velocity sensor 19, differential amplifier 41, A/D converter 42, offset outputting unit 43 and D/A converter 44.

Angular velocity sensor 19 outputs the above-described sensor signal. Differential amplifier 41 amplifies (i.e., performs differential amplification on) a difference signal between a sensor signal and an offset signal that is provided from D/A converter 44, and outputs the difference signal thus amplified. A/D converter 42 converts an analog output signal from differential amplifier 41 into a digital signal. Under control of CPU 45, offset outputting unit 43 outputs a digital offset signal. D/A converter 44 converts this digital offset signal into an analog offset signal, and supplies the analog offset signal to differential amplifier 41.

On the basis of the magnitude of the output signal from A/D converter 42 in a specific period, CPU 45 variably sets an offset signal for output from offset outputting unit 43, and also variably sets an amplification factor of differential amplifier 41. Furthermore, the output signal from A/D converter 42 is also provided to camera-shake-information generating unit 46. On the basis of the magnitude of the output signal from A/D converter 42, camera-shake-information generating unit 46 generates camera-shake information representing shake of the imaging device which is induced from camera shake or the like. The camera-shake information is for example a motion vector in which shake of the imaging device is converted into a vector on an image. On the basis of this camera-shake information, camera-shake correction of an optical type or of an electronic type is performed. Incidentally, the "shake of the imaging device" includes a swing and a rotation of the imaging device in an arbitrary direction.

Figure 5:
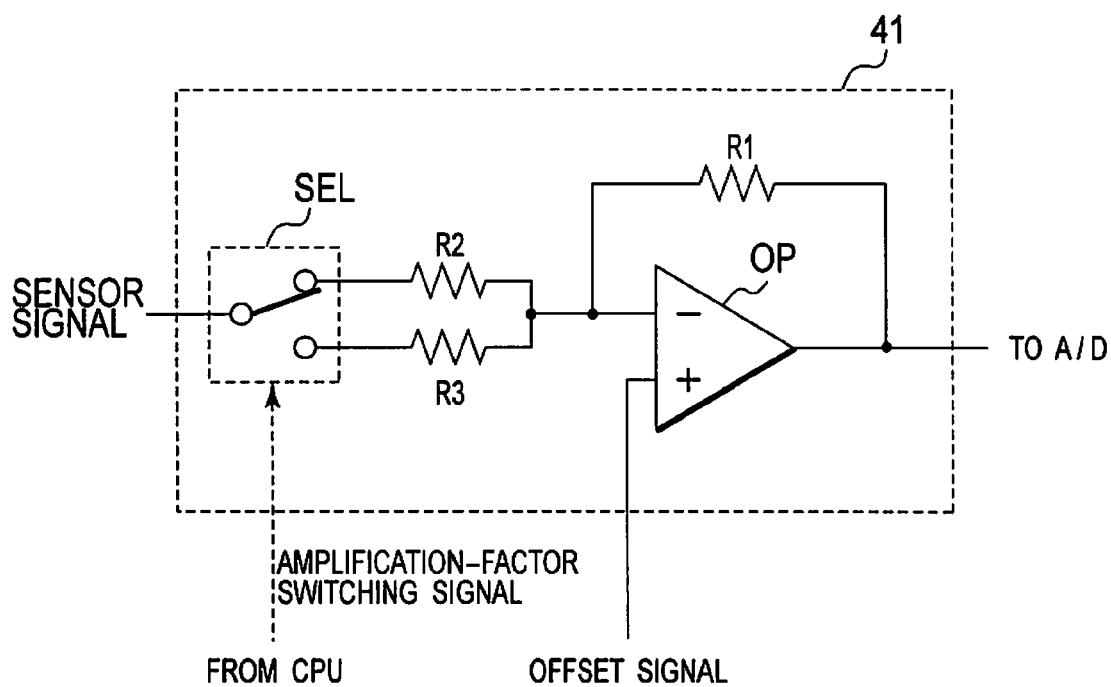
FIG. 5 shows an example of an internal circuit of a differential amplifier in FIG. 4.

Differential amplifier 41 is capable of setting two stages of amplification factors. FIG. 5 shows an example of an internal circuit of differential amplifier 41. Differential amplifier 41 in FIG. 5 includes operational amplifier OP, selector SEL and resistors R1 to R3. In accordance with an amplification-factor switching signal from CPU 45, selector SEL supplies a sensor signal to only one of: one end of resistor R2 and one end of resistor R3. A common connection is made between the other ends of resistors R2, R3 and an inverting input terminal (−) of operational amplifier OP, and a common connection is also made between the other ends resistors R2, R3 and an output terminal of operational amplifier OP via resistor R1. An offset signal from D/A converter 44 is supplied to a non-inverting input terminal (+) of operational amplifier OP. A signal from the output terminal of operational amplifier OP is outputted to A/D convert 42 as an output signal from differential amplifier 41.

It is now assumed that, to obtain a desired camera-shake detection sensitivity, the amplification factor needs to be forty. This amplification factor of forty is referred to as a "high amplification factor," and a camera-shake detection processing mode in which differential amplifier 41 amplifies a sensor signal at the high amplification factor is referred to as a "high amplification factor mode." In this embodiment, an imaging device is provided having a function in which an offset of angular velocity sensor 19 is relatively coarsely adjusted. This adjustment is referred to as a "coarse offset adjustment." To perform this coarse offset adjustment, the amplification factor that is temporarily set is referred to as a "low amplification factor." It is now assumed that the low amplification factor is four. A camera-shake detection processing mode in which differential amplifier 41 amplifies a sensor signal at the low amplification factor is referred to as a "low amplification factor mode."

Resistance values of resistors R1, R2 and R3 are denoted by r1, r2 and r3, respectively. When a sensor signal is provided to the inverting input terminal (−) of operational amplifier OP through resistor R2, the amplification factor of differential amplifier 41 becomes r1/r2, while when a sensor signal is provided to the inverting input terminal (−) thereof through resistor R3, the amplification factor of differential amplifier 41 becomes r1/r3. Then, the resistance values of resistors R1 to R3 are selected such that r1/r2=40 and concurrently r1/r3=4 are satisfied.

In the case of the high amplification factor, CPU 45 controls selector SEL so that a sensor signal can be provided to the inverting input terminal (−) of operational amplifier OP through resistor R2. Meanwhile, in the case of the low amplification factor, CPU 45 controls selector SEL so that a sensor signal can be provided to the inverting input terminal (−) of operational amplifier OP through resistor R3.

Operation in the first embodiment will be schematically described with reference to FIGS. 6A to 6C. In each of FIGS. 6A to 6C, a vertical axis represents output signals from differential amplifier 41; a horizontal axis represents time; a solid line 100 represents a reference potential level (0V); and dotted lines 101, 102 respectively represent saturation levels of A/D converter 42. The saturation level means the maximum or minimum input voltage level at which an A/D conversion can be performed. A/D converter 42 is capable of converting an analog input voltage, ranging from the minimum input voltage level to the maximum input voltage level, into a digital signal. A/D converter 42 outputs a certain minimum digital signal value converted from an analog input voltage smaller than the minimum input voltage level, and also outputs a certain maximum digital signal value converted from an analog input voltage larger than the maximum input voltage level. In addition, output signals, in FIGS. 6A to 6C, of angular velocity sensor 19 are assumed to be the same.

Figure 6A:
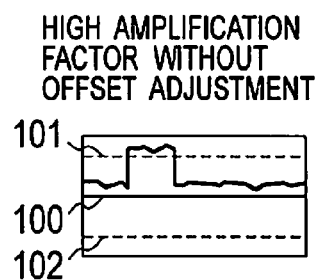
FIGS. 6A to 6C each show an output signal state of the differential amplifier in FIG. 4.

FIG. 6A shows output signals from differential amplifier 41 in the case where detection unit 40 is caused to operate in the high amplification factor mode without performing a coarse offset adjustment. In a state shown in FIG. 6(a), a relatively large offset has occurred, and this offset is mainly an offset of the output signal from angular velocity sensor 19. As a result, there a period exists in which the output signal from differential amplifier 41 exceeds the saturation level. This period corresponds to a period in which relatively large camera shake occurs.

Figure 6B:
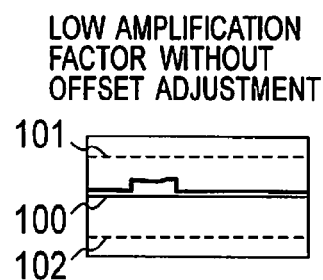

FIG. 6B shows output signals from differential amplifier 41 in the case where detection unit 40 is caused to operate in the low amplification factor mode without performing the coarse offset adjustment. In the coarse offset adjustment, output signals from A/D converter 42 in a certain period are sampled with the amplification factor of differential amplifier 41 set to the low amplification factor. Using the mean value of the sampled output signals, an offset signal is calculated, which is provided to differential amplifier 41 operating at the high amplification factor. Since the amplification factor of differential amplifier 41 is set to the low amplification factor, even when an offset component is superimposed on the output signal from angular velocity sensor 19, the output of A/D converter 42 will not be saturated.

Figure 6C:
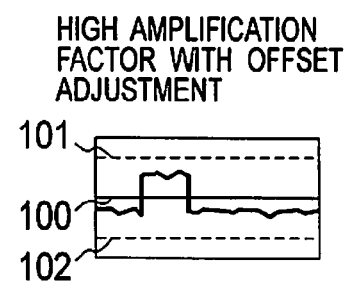

FIG. 6(c) shows output signals from differential amplifier 41 in the case where, after the offset signal is provided to differential amplifier 41 (i.e. after the coarse offset adjustment is performed), detection unit 40 is caused to operate in the high amplification factor mode.

As described above, in this embodiment, detection unit 40 operates in the low amplification factor mode, so that a necessary offset signal calculation is performed (FIG. 6(b)), and then this offset signal is used in the high amplification factor mode (FIG. 6(c)). Thus, it is possible to remove the offset component of angular velocity sensor 19, which is contained in the input voltage of A/D converter 42, in a short time, and it is possible to avoid the saturation of an output of A/D converter 42, which is derived from this offset component. Furthermore, on the basis of the output signal from A/D converter 42 in the high amplification factor mode, camera-shake-information generating unit 46 generates the camera-shake information. Thus, the final camera-shake detection sensitivity is not reduced, and it is possible to detect camera shake with high accuracy. The offset component of angular velocity sensor 19 drifts due to a change in a peripheral temperature of angular velocity sensor 19, and due to a temperature increase caused by the operation of angular velocity sensor 19 itself. Accordingly, in practice, by periodically repeating a series of these processes, it is possible to prevent the saturation of output from A/D converter 42 all the time.

Figure 7:
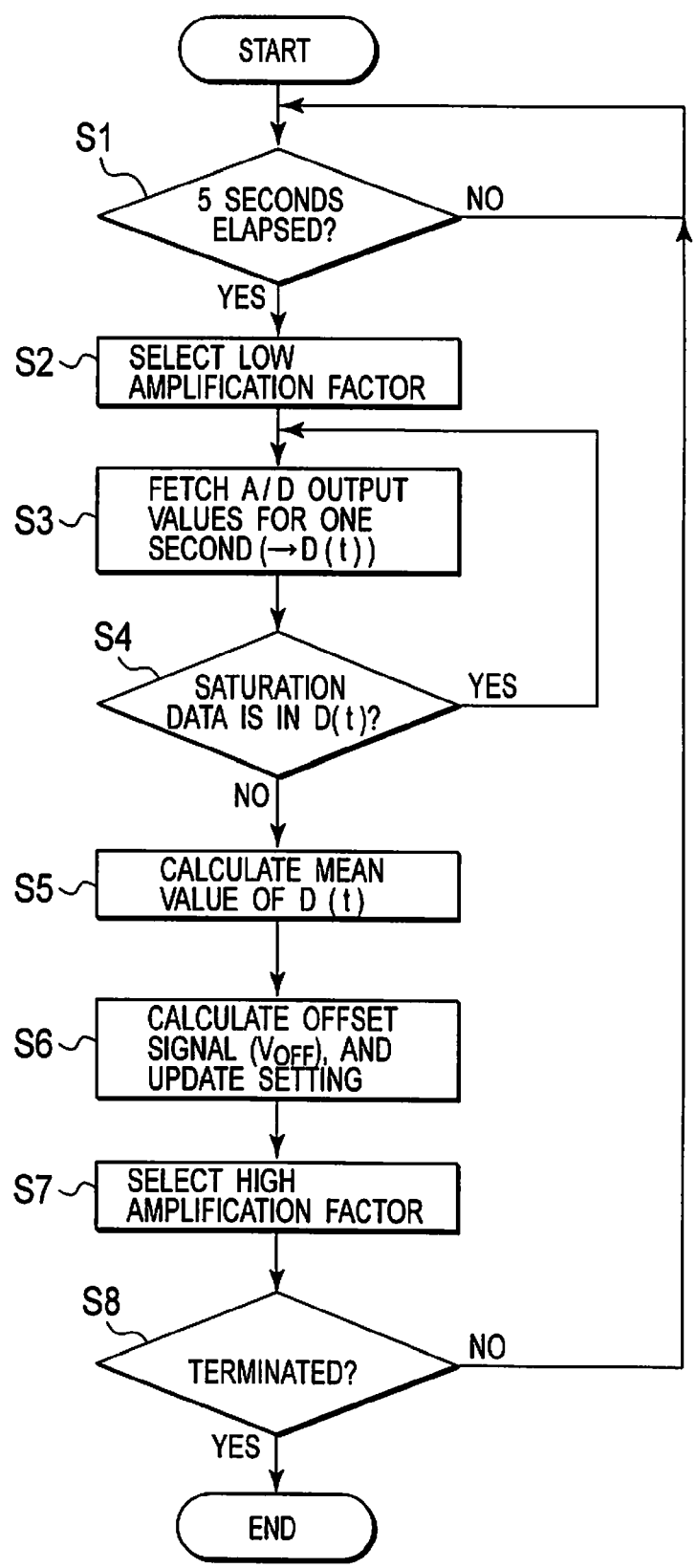
FIG. 7 is an operation flowchart of an imaging device of a first embodiment for camera-shake detection.

Referring to FIG. 7, a flow of the reviewed operation will be described more specifically. FIG. 7 is an operation flowchart of the imaging device of the first embodiment for camera-shake detection. Hereinafter, the output signal from A/D converter 42 may also be referred to as simply an A/D output signal. The digital value of the output signal from A/D converter 42 may be referred to as an A/D output value.

Once the imaging device is turned on, the coarse offset adjustment commences. First, in Step S1, the process waits until five seconds of elapsed time after the last coarse offset adjustment commences. Step S1 is provided in order to omit unnecessary calculations taking into consideration that there is no extreme offset-drift within a short period of time of approximately five seconds during which an A/D output signal is saturated.

After five seconds elapses, the process moves to Step S2, and CPU 45 sets the amplification factor of differential amplifier 41 to the low amplification factor. Thereafter, in Step S3, CPU 45 fetches A/D output values, each of which corresponds to that of an A/D output value for one second. Now, the sampling frequency of A/D converter 42 is assumed to be 1 kHz (kilohertz). As a result, in Step S3, one thousand A/D output values are obtained. The one thousand A/D output values are represented by D(t).

Subsequently, in Step S4, CPU 45 checks whether saturation data are in the one thousand A/D output values D(t) obtained in Step S3. When the saturation data are in D(t), it is determined that the process is in an abnormal state (e.g., an imaging device undergoes a large shaking event during Step S3), and the process returns to Step S3. Note that the saturation data designates an A/D output value (i.e., the above-described maximum or minimum digital signal value) which is obtained when an input voltage exceeding the saturation level is provided to A/D converter 42.

When the saturation data is not in D(t), the process moves to Step S5, and CPU 45 then calculates the mean value of D(t). Subsequently, in Step S6, using this mean value, CPU 45 calculates an offset signal value that is provided to differential amplifier 41 in order to remove the offset component of angular velocity sensor 19 in the high amplification factor mode. When this offset signal value is denoted by VOFF, and when an analog voltage conversion value of the mean value of D(t) (the mean value of input voltages of A/D converter 42 corresponding to D(t)) is denoted by $D_{AVE}$, the following equation holds: $V_{OFF} = -D_{AVE} \times (r3/r1)$. For example, when $D_{AVE} = -40$ [mV], $r3/r1 = \frac{1}{4}$, so that $V_{OFF}$ becomes +10 [mV]. In Step S6, CPU 45 controls offset outputting unit 43, whereby an offset signal (offset voltage) having the calculated offset signal value VOFF is provided to the non-inverting input terminal (+) of differential amplifier 41 through offset outputting unit 43 and D/A converter 44.

Thereafter, CPU 45 returns the amplification factor of differential amplifier 41 to the high amplification factor (Step S7). When the power supply to the imaging device is not cut off, the process returns to Step S1 (Step S8), and repeats the processes of the above-described steps. Camera-shake-information generating unit 46 generates camera-shake information (i.e., detects the shake of the imaging device) on the basis of the A/D output values in the high amplification factor mode.

As described above, a series of processes, including the updating of an offset signal on the basis of the A/D output values obtained in the low amplification factor mode, and the generation of camera-shake information on the basis of the A/D output values obtained in the high amplification factor mode are repeated, so that camera-shake is detected with high accuracy while output saturation of A/D converter 42 is prevented.

[Variation Example on Mode Conversion]

In a process in which a difference signal between a sensor signal and an offset signal is converted into an A/D output signal in the above-described configuration example, a function of selecting and setting an amplification factor of differential amplifier 41 is provided, so that the above-described processes are performed. However, a function which produces the same effect may be provided to any of the functional operation between the inputting to differential amplifier 41 and outputting to A/D converter 42. A variation example obtained by making such a variation is referred to as a "mode conversion variation example." A mode conversion variation example that is applicable to desirable embodiments will be described later.

The mode conversion variation example is described next. It is now assumed that, when an output signal from A/D converter 42 is expressed in 10 bits, and when input voltages at the minimum input voltage level and the maximum input voltage level are provided to A/D converter 42, then A/D converter 42 respectively outputs digital values of 0 and 1023. Furthermore, a negative power-supply voltage and a positive power-supply voltage in differential amplifier 41 and A/D converter 42 are −5 [V] or less and 5 [V] or more, respectively.

By way of example, a conversion scale of A/D converter 42 may be variably set between a first conversion scale and a second conversion scale, and the amplification factor of differential amplifier 41 is then fixed. To be more specific, for example, in the first conversion scale, the minimum input voltage level of A/D converter 42 and the maximum input voltage level thereof are respectively set to −0.5 [V] and +0.5 [V], and A/D converter 42 allocates digital values of 0 to 1023 to input voltages in the voltage range of −0.5 [V] to +0.5 [V]. In the second conversion scale, the minimum input voltage level of A/D converter 42 and the maximum input voltage level thereof are respectively set to −5 [V] and +5 [V], and A/D converter 42 allocates digital values of 0 to 1023 to input voltages in the voltage range of −5 [V] to +5 [V]. Camera-shake detection processing modes in which the conversion scales of A/D converter 42 are set to be the first and second conversion scales are respectively called a "first conversion mode" and a "second conversion mode."

In Step S2 described above, instead of selecting the low amplification factor, CPU 45 sets the camera-shake detection processing mode to the second conversion mode. In other words, the conversion scale of A/D converter 42 is set to the second conversion scale. This corresponds to reduction of resolution (i.e., camera-shake detection sensitivity) of A/D converter 42.

On the basis of the mean value of A/D output values for one second obtained in the second conversion mode, as in Steps S5 and S6 described above, CPU 45 calculates an offset voltage value in order to remove an offset component of angular velocity sensor 19 from A/D output values in the first conversion mode, and provides an offset signal having the offset voltage value thus calculated to differential amplifier 41. Thereafter, in Step S7 described above, the conversion scale of A/D converter 42 is returned to the first conversion scale, and the process moves to Step S1. Camera-shake-information generating unit 46 generates camera-shake information on the basis of the A/D output values while the conversion scale of A/D converter 42 is set to the first conversion scale.

Figure 8:
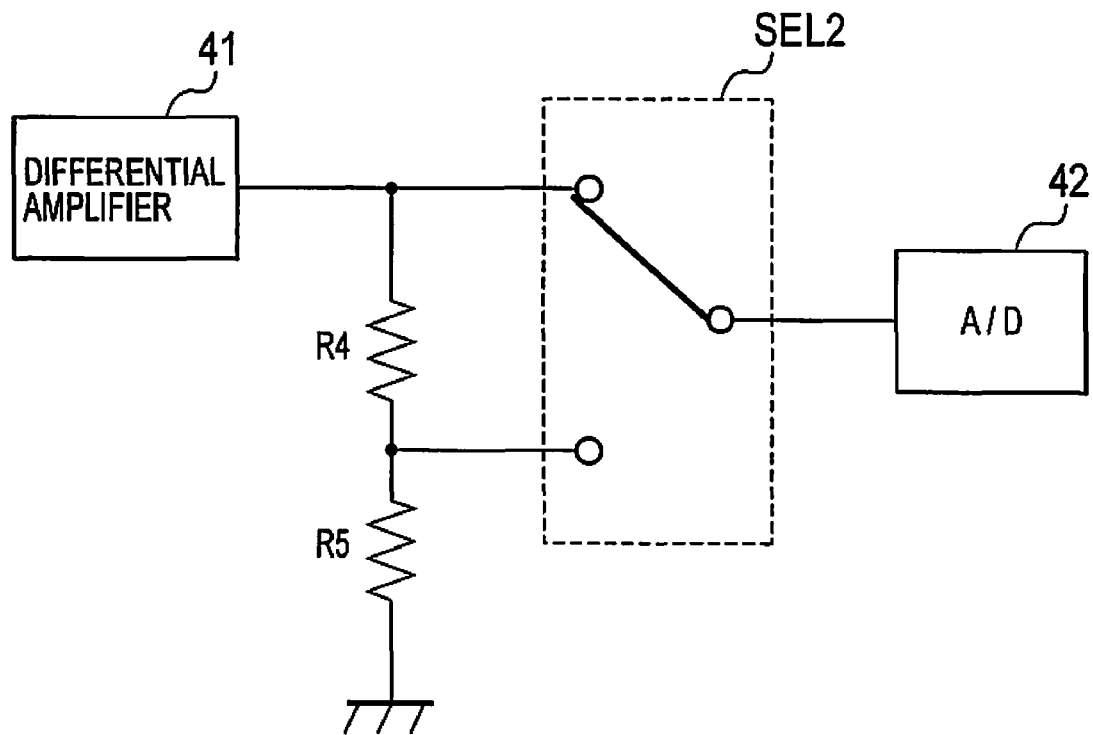
FIG. 8 shows a variation example of a portion of a configuration in FIG. 4.

In addition, as shown in FIG. 8, it is possible to adopt a configuration in which voltage dividing resistors R4, R5, which divide an output signal from differential amplifier 41, and selector SEL2 are provided in detection unit 40, and in which an output signal itself from differential amplifier 41 or the divided output signal is selectively provided to A/D converter 42. In this case, the amplification factor of differential amplifier 41 and the conversion scale of A/D converter 42 are fixed.

In this case, when obtaining A/D output values for offset signal calculation, the output signal from differential amplifier 41 is divided to $\frac{1}{10}$ using voltage dividing resistors R4, R5, and the signal thus divided is provided to A/D converter 42. When A/D output values for camera-shake information calculation are obtained, it is sufficient to provide the output signal from differential amplifier 41 to A/D converter 42 without conversion. Thereby, it is also possible to obtain the same effect as switching between the first conversion mode (first conversion scale) and the second conversion mode (second conversion scale).

In any case, it is sufficient to variably set a conversion ratio between the A/D output value and the difference signal of a sensor signal and an offset signal in a way that the conversion ratio can be changed in two stages: first and second conversion ratios as separate stages. CPU 45 switches the camera-shake detection processing mode between a first mode and a second mode. In the first mode, an A/D output value is obtained with the conversion ratio set to the first conversion ratio. Meanwhile, in the second mode, an A/D output value is obtained with the conversion ratio set to the second conversion ratio. The offset signal is updated on the basis of the A/D output value obtained in the second mode, and the camera-shake information is generated on the basis of the A/D output value obtained in the first mode. The first mode corresponds to the above-described high amplification factor mode and the first conversion mode (the first conversion scale), and the second mode corresponds to the low amplification factor mode and the second conversion mode (the second conversion scale).

Second Embodiment

Next, a second embodiment will be described. A configuration of the second embodiment for camera-shake detection is the same as that shown in FIG. 4, so that a further description is omitted. The above-described mode conversion variation example is also applicable to this embodiment. A description is given of a case where an amplification factor of differential amplifier 41 is variably set to perform an offset adjustment. The same is true in other embodiments to be described later.

Figure 9:
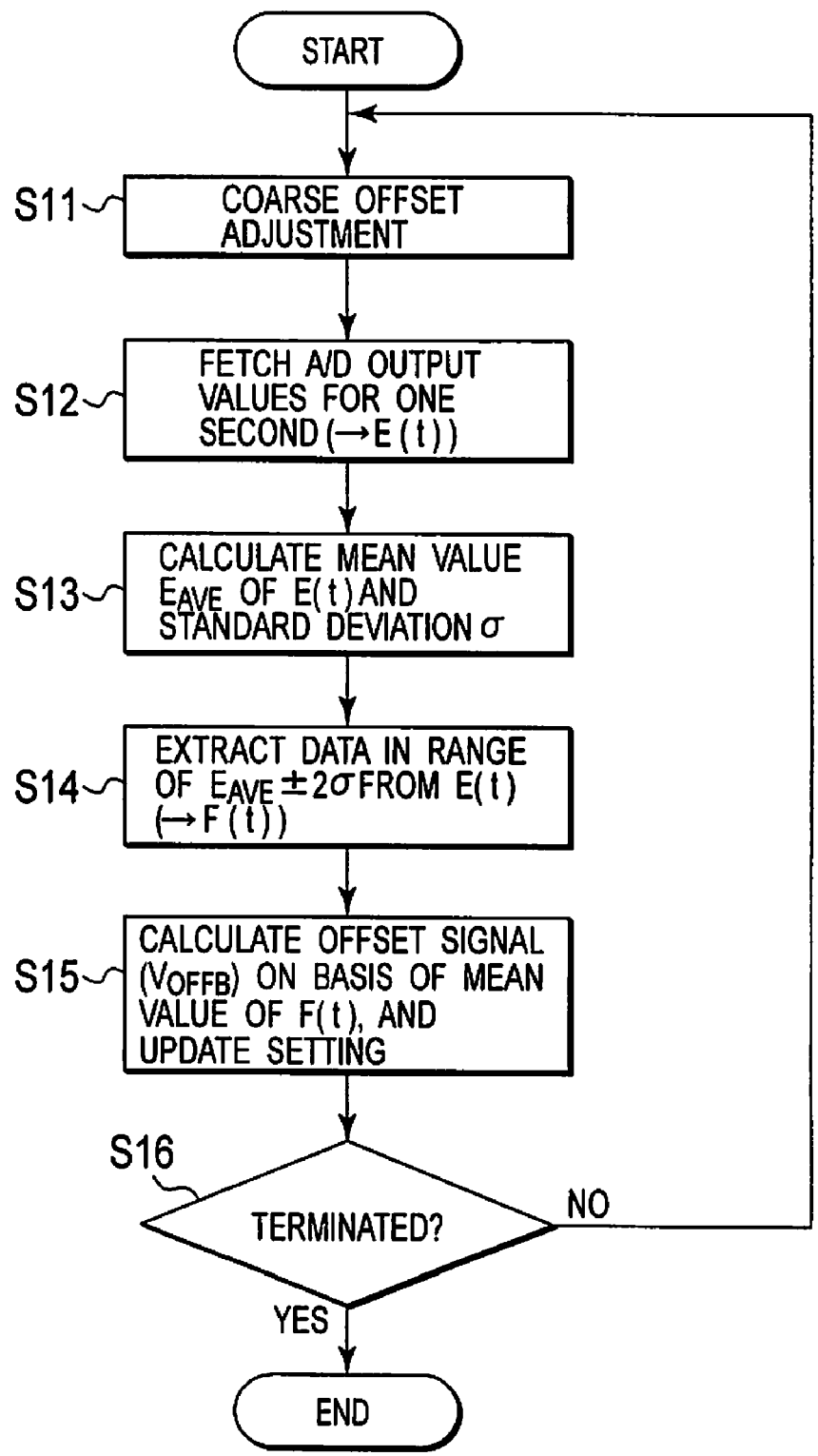
FIG. 9 is an operation flowchart of an imaging device of a second embodiment for camera-shake detection.

In the second embodiment, in addition to the coarse offset adjustment in the first embodiment, a fine offset adjustment is performed. This is more specifically described with reference to FIG. 9. FIG. 9 is an operation flowchart of an imaging device of the second embodiment for camera-shake detection.

Figure 10A:
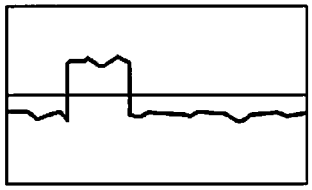
FIGS. 10A to 10C each show an output signal state of a differential amplifier in FIG. 4 according to the second embodiment.

First, once the imaging device is turned on, the coarse offset adjustment is performed in Step S11. Specifically, the processes in Steps S1 to S7 described in the first embodiment are performed. FIG. 10A shows a state of output signals from differential amplifier 41 after the above-described coarse offset adjustment is performed. This state is similar to that shown in FIG. 6C. While the offset component of angular velocity sensor 19 has been removed substantially, a certain quantity thereof still remains.

After the coarse offset adjustment is performed in Step S11, the process moves to Step S12. Since immediately after the coarse offset adjustment consisting of Steps S1 to S7 in FIG. 7 is performed, the amplification factor of differential amplifier 41 at this time remains set to a high amplification factor. In Step S12, CPU 45 fetches A/D output values for one second in the high amplification factor mode. It is preferable that this fetching be performed immediately after the coarse offset adjustment in Step S11. It is now assumed that the sampling frequency of A/D converter 42 is 1 kHz. As a result, in Step S12, one thousand A/D output values are obtained. The one thousand A/D output values obtained in Step S12 are represented by E(t).

Thereafter, in Step S13, when the one thousand A/D output values E(t) are set to a parent population, CPU 45 calculates the mean value EAVA of E(t) and the standard deviation σ thereof. Incidentally, $σ^2$ represents the variance (population variance) of the parent population.

Figure 11:
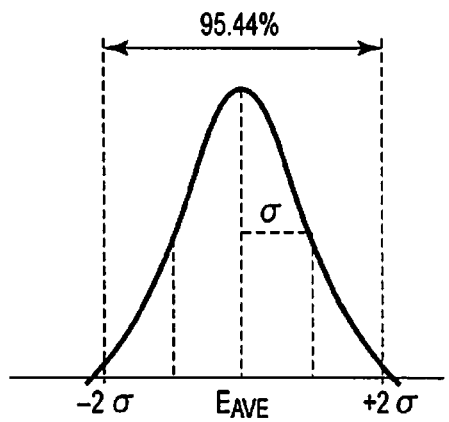
FIG. 11 illustrates a significance of a fine offset adjustment according to the second embodiment.
Figure 12:
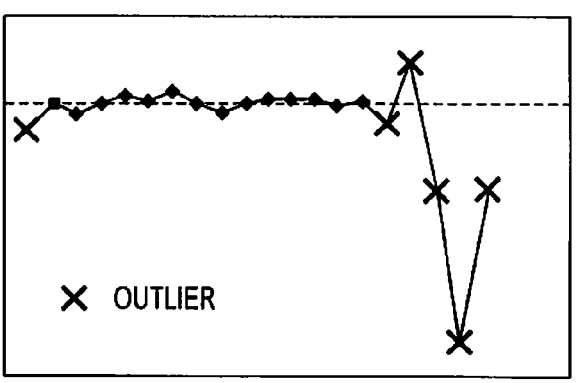
FIG. 12 illustrates the significance of the fine offset adjustment according to the second embodiment.

In subsequent Step S14, CPU 45 extracts the A/D output values in the range of (EAVA−2σ) to (EAVA+2σ) inclusive from the parent population E(t) consisting of the one thousand A/D output values. As shown in FIG. 11, this statistically means that 95.44% of the data are extracted. The population of the extracted A/D output values is represented by F(t). As shown in FIG. 12, so-called outliers of the A/D output values are dropped from F(t). Incidentally, a value "2σ" delimiting the range of extraction is an example, and then can be variably set.

Thereafter, in Step S15, CPU 45 calculates the mean value of A/D output values F(t) extracted in Step S14, and calculates, using this mean value, an offset signal value for provision to differential amplifier 41 to remove the offset component of angular velocity sensor 19 in the high amplification factor mode.

Denoting this offset signal value by $V_{OFFB}$, and denoting an analog voltage converted value (mean value of input voltages of A/D converter 42 corresponding to F(t)) of the mean value of F(t) by $F_{AVE}$, the following equation holds: $V_{OFFB} = -F_{AVE} \times (r2/r1)$. For example, when $F_{AVE} = -120$ [mV], $r2/r1 = 1/40$, so that $V_{OFFB}$ becomes +3 [mV]. CPU 45 in FIG. 4 controls offset outputting unit 43, so that the offset signal (offset voltage) having the calculated offset signal value $V_{OFFB}$ is provided to the non-inverting input terminal (+) of differential amplifier 41 through offset outputting unit 43 and D/A converter 44.

Figure 10B:
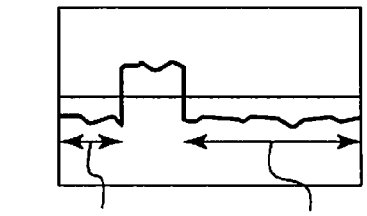

As shown in FIG. 10B, the process consisting of Steps S13 to S15 corresponds to a process in which: a stable period is sought by statistically excluding the outliers from the A/D output values (sensor signals); and an accurate offset signal is calculated using the mean value of the A/D output values in the stable period so that the offset signal is updated.

Subsequent to the process in Step S15, the process returns to Step S11 (Step S16) when the power supply to the imaging device is not cut off. Thereafter, the coarse offset adjustment in Step S11 and the fine offset adjustment consisting of Steps S12 to S15 are alternately and periodically repeated. As in the first embodiment, camera-shake-information generating unit 46 in FIG. 4 generates camera-shake information on the basis of the A/D output values in the high amplification factor mode (i.e., detects the shake of the imaging unit). It is preferable that camera-shake information be generated on the basis of the A/D output values in the high amplification factor mode after the fine offset adjustment.

Figure 10C:
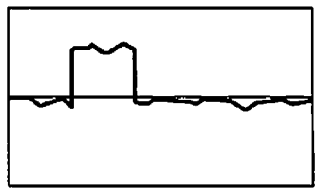

FIG. 10(c) shows a state of output signals of differential amplifier 41 after the updating of the offset signal by the fine offset adjustment. In accordance with this embodiment, the outliers of A/D output values (sensor signals) created by shake of the unstable imaging device, are excluded. In this way, it is possible to evaluate the offset component of angular velocity sensor 19 with a high accuracy. As a result, compared with the first embodiment, it becomes possible to more accurately remove the offset component, and more accurately perform camera-shake detection. Furthermore, the coarse offset adjustment and the fine offset adjustment are alternately and periodically repeated, so that it is possible to constantly detect camera-shake with high accuracy.

Third Embodiment

Figure 13:
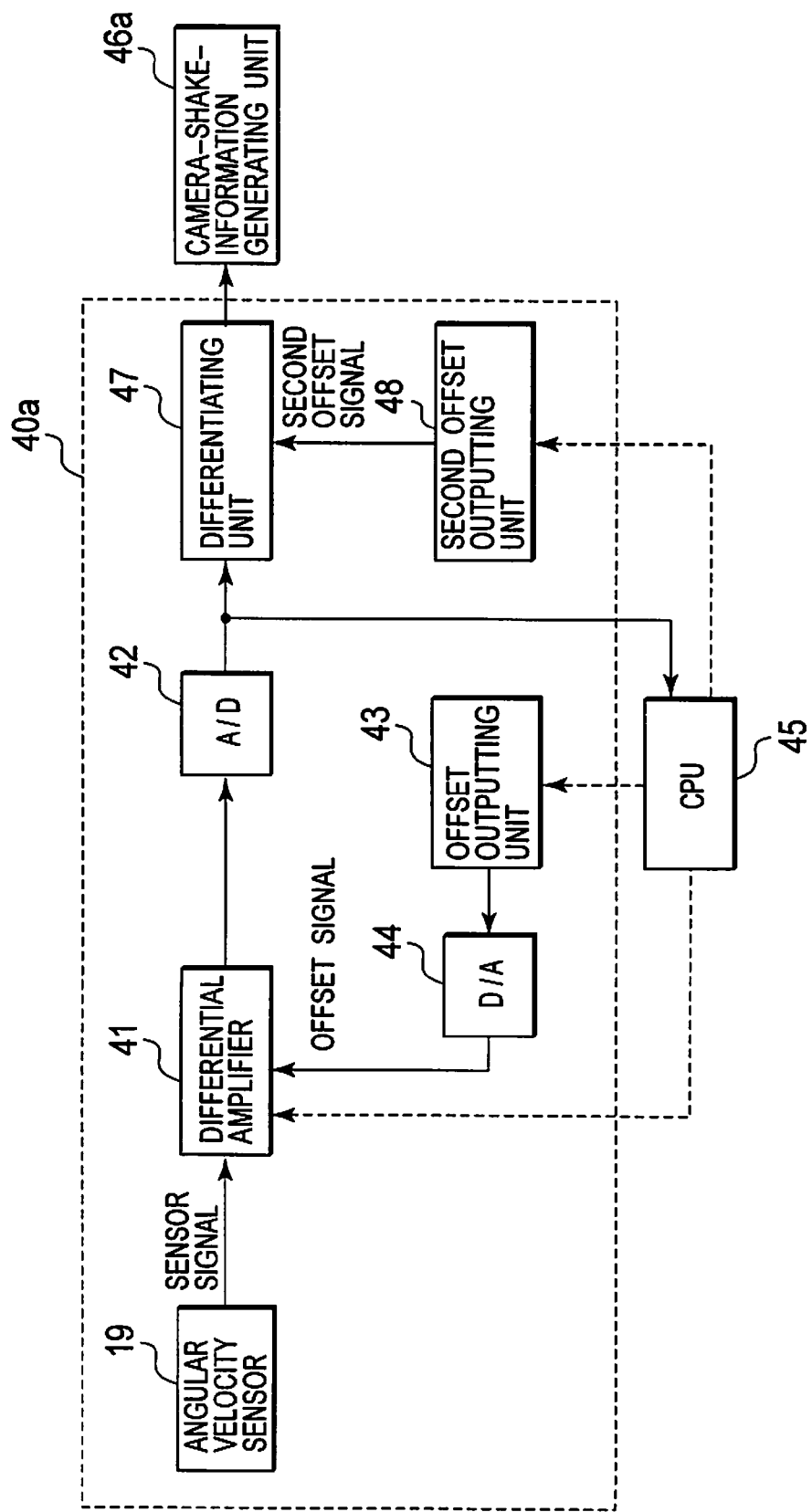
FIG. 13 is a block diagram of a portion involved in camera-shake detection according to a third embodiment.

Next, a third embodiment will be described. FIG. 13 is a block diagram of a portion involved in camera-shake detection according to the third embodiment. Detection unit 40a shown in FIG. 13 is one which is provided to camera-shake detecting unit 18 in FIG. 1, and which detects an angular velocity in the pan direction. CPU 45 and camera-shake-information generating unit 46a shown in FIG. 13 are provided to, for example, main controller 13.

Detection unit 40a includes angular velocity sensor 19, differential amplifier 41, A/D converter 42, offset outputting unit 43 and D/A converter 44. These are the same as those shown in FIG. 4. In addition, detection unit 40a, further, includes differentiating unit 47 and second offset outputting unit 48.

Angular velocity sensor 19 outputs the above-described sensor signals. Differential amplifier 41 amplifies (i.e., performs differential amplification on) a difference signal between a sensor signal and an offset signal provided from D/A converter 44, and outputs the difference signal thus amplified. A/D converter 42 converts an analog output signal from differential amplifier 41 into a digital signal. Under control of CPU 45, offset outputting unit 43 outputs a digital offset signal. D/A converter 44 converts this digital offset signal into an analog offset signal, and supplies the analog offset signal to differential amplifier 41.

As in the first and second embodiments, on the basis of the output signal from A/D converter 42 in the low amplification factor mode, CPU 45 variably sets an offset signal for output from offset outputting unit 43. In other words, the coarse offset adjustment is performed. Furthermore, as in the first and second embodiments, CPU 45 also variably sets an amplification factor of differential amplifier 41.

In this embodiment also, the fine offset adjustment is performed, and a second offset signal to be outputted from second offset outputting unit 48 is variably set on the basis of the output signal of A/D converter 42 in the high amplification factor mode. Differentiating unit 47 outputs, to camera-shake-information generating unit 46a, a digital signal obtained by subtracting the second offset signal from the output signal from A/D converter 42. Camera-shake-information generating unit 46a generates camera-shake information representing shake of the imaging device, on the basis of the output signal from differentiating unit 47.

Figure 14:
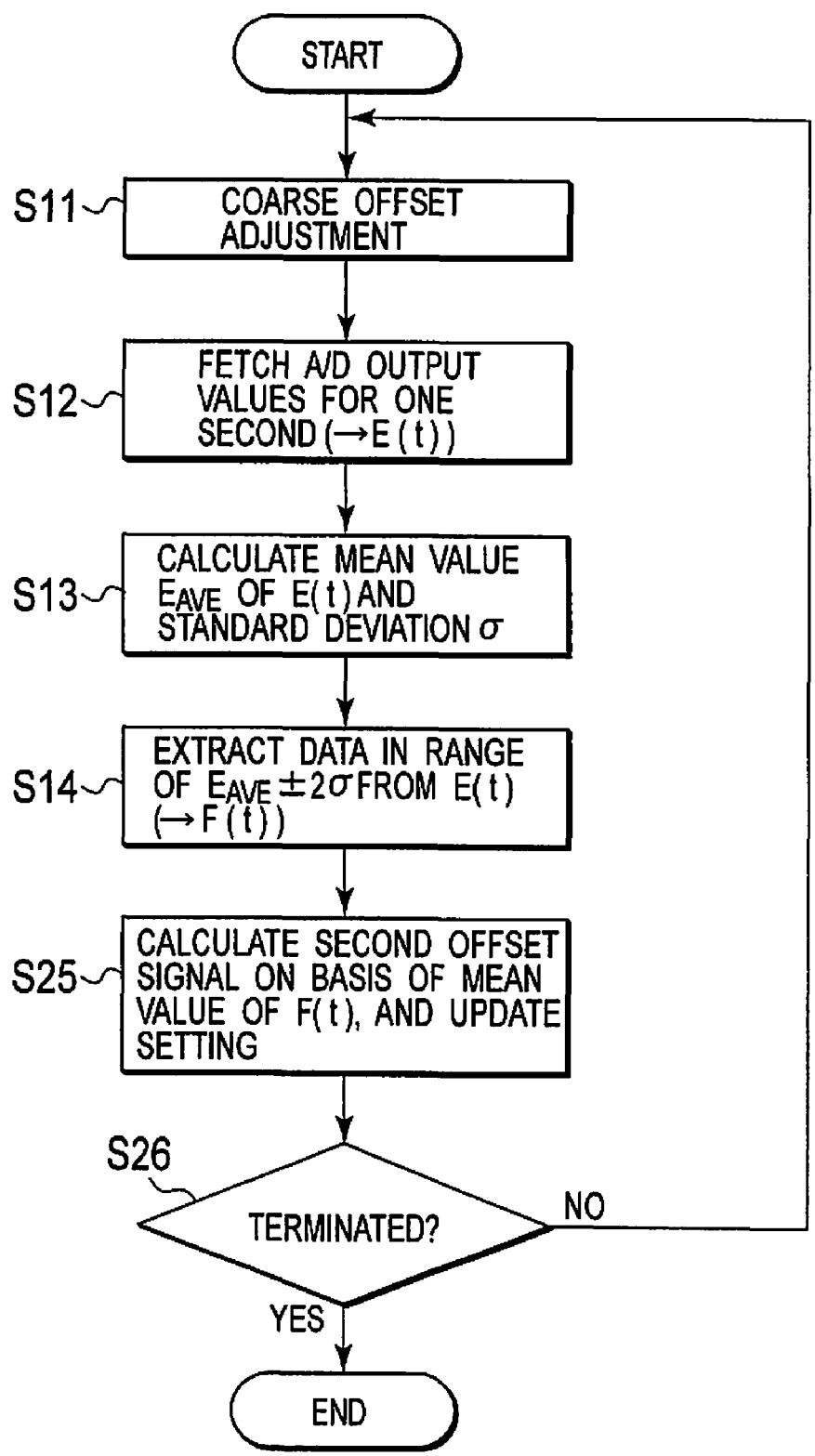
FIG. 14 is an operation flowchart of an imaging device of the third embodiment for camera-shake detection.

Referring to FIG. 14, a flow of the operation will be reviewed more specifically. FIG. 14 is an operation flowchart of the imaging device of the third embodiment for camera-shake detection.

First, once the imaging device is turned on, the process moves to Step S11, and the coarse offset adjustment is performed. Thereafter, processes in Steps S12 to 14 are performed in sequence. Contents of the processes in Steps S11 to S14 are the same as those in the second embodiment (FIG. 9), so that a further description is omitted. In the third embodiment, after the process in Step S14 is performed, the process moves to Step S25.

In Step S25, CPU 45 calculates the mean value of A/D output values F(t) extracted in Step S14. On the basis of this mean value, CPU 45 calculates a second offset signal to be provided to differentiating unit 47 in order to remove the offset component of angular velocity sensor 19 from the output signal of differentiating unit 47 in the high amplification factor mode. Furthermore, CPU 45 controls second offset outputting unit 48 so that the second offset signal thus calculated can be provided to differentiating unit 47. A signal value of this second offset signal is assumed to be the mean value of F(t) itself.

The processes consisting of Steps S13, S14 and S25 correspond to those in which: a stable period is sought by statistically excluding outliers from the A/D output values (sensor signals); and an accurate second offset signal is calculated using the mean value of the A/D output values in the stable period so that the second offset signal is updated.

After Step S25, the process returns to Step S11 (Step S26) when the power supply to the imaging device is not cut off. Thereafter, the coarse offset adjustment in Step S11, and the fine offset adjustment consisting of Steps S12 to S14 and S25 are alternately and periodically repeated. Camera-shake-information generating unit 46a generates camera-shake information on the basis of the output signal from differentiating unit 47 in the high amplification factor mode (i.e., detects the shake of the imaging unit). It is preferable that camera-shake information be generated on the basis of the output signal from differentiating unit 47 in the high amplification factor mode after the fine offset adjustment.

As in the second embodiment, in accordance with this embodiment, the outliers of A/D output values (sensor signals) generated from shake of the unstable imaging device, are excluded, so that the offset component of angular velocity sensor 19 can be evaluated with high accuracy. As a result, compared with the first embodiment, it becomes possible to more accurately remove the offset component, and more accurately perform camera-shake detection. Furthermore, the coarse offset adjustment and the fine offset adjustment are alternately and periodically repeated, so that it is possible to constantly detect camera-shake with high accuracy.

In addition, when the configuration as in the second embodiment is adopted, the accurate offset signal calculated as the digital value is provided to differential amplifier 41 through D/A converter 44. Accordingly, an error due to a D/A conversion (conversion error, non-linearity, offset in a D/A conversion, or the like) is superimposed on an output signal from A/D converter 42. Meanwhile, when the configuration the third embodiment is adopted, such an error is removed, and thus camera shake is detected with higher accuracy.

Fourth Embodiment

When shutter button 17a is pressed half during a series of processes in which the coarse offset adjustment and the fine offset adjustment are alternately performed, the fine offset adjustment may be immediately performed. Such an embodiment is described as a fourth embodiment. The fourth embodiment corresponds to a variation example of the second or third embodiment.

Shutter button 17a is operable in two stages of half pressing (first release) and fully pressing (second release). When a user presses shutter button 17a, shutter button 17a, first, comes to a state where it is half pressed, and when further pressed, shutter button 17a comes to a state where it is fully pressed. Main controller 13 is capable of detecting whether shutter button 17a is half pressed, fully pressed or not pressed.

An imaging device includes an automatic focus function, and main controller 13 calculates, as an AF evaluation value, the amount of contrast on a predetermined contrast evaluation region within each captured image obtained at a predetermined frame interval. When shutter button 17a is half pressed, main controller 13 obtains AF evaluation values in sequence while moving a position of focus lens 31 in FIG. 2 at a predetermined interval. Main controller 13 determines, as a focus lens position, the position of focus lens 31 at which the AF evaluation value becomes maximum. When shutter button 17a is further pressed and thus fully pressed, main controller 13 arranges the position of focus lens 31 on the focus lens position, and thereafter causes imaging unit 11 to capture an image. The image obtained by this capturing is stored in recording medium 16 as a still image captured in response to the pressing of shutter button 17a. At this time, camera-shake information based on a sensor signal in the exposure period for this still image can be stored in recording medium 16 while associated with this still image.

Figure 15:
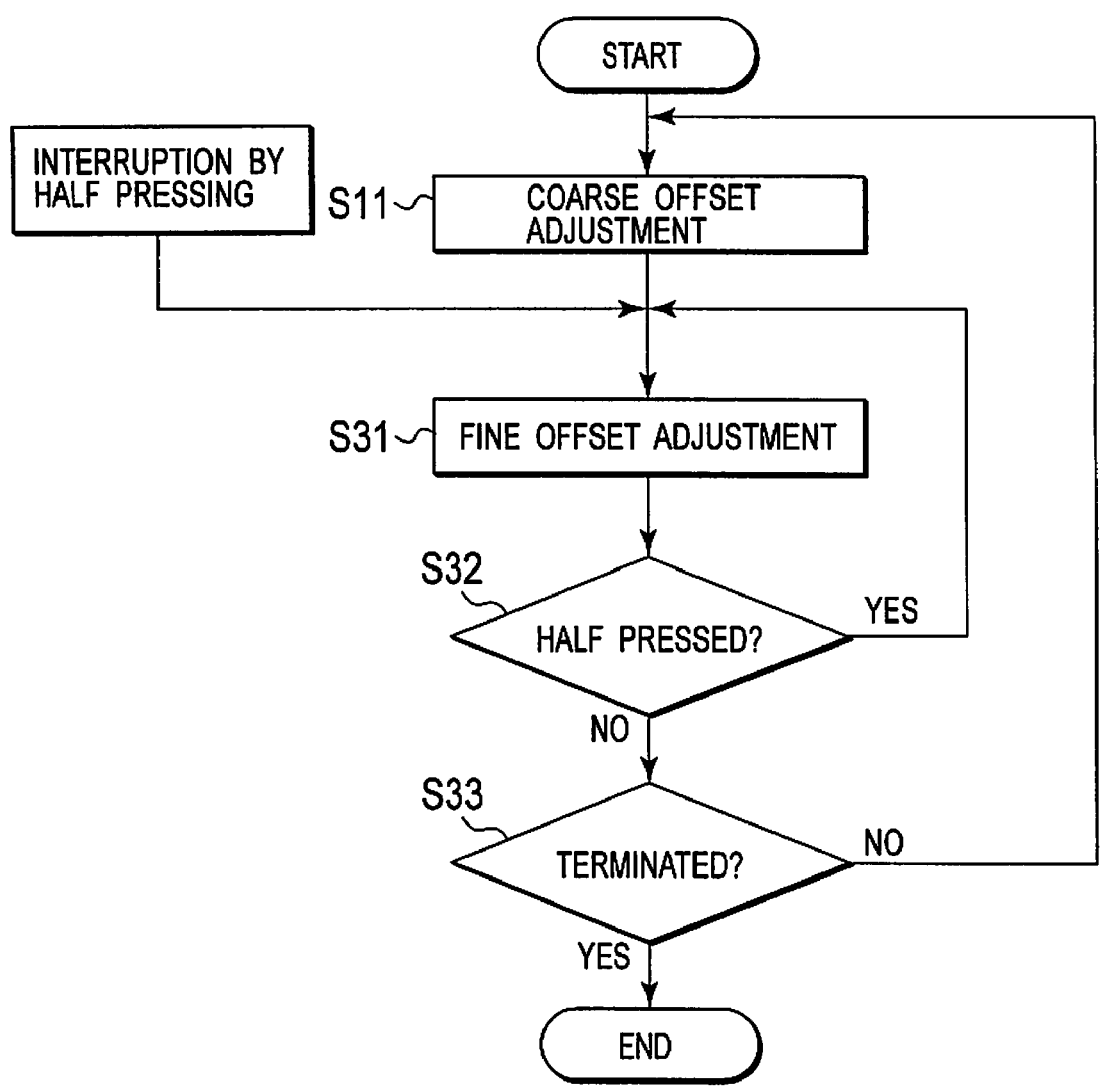
FIG. 15 is an operation flowchart of the imaging device of a fourth embodiment for camera-shake detection.

Referring to FIG. 15, a flow of the operation will be specifically described. FIG. 15 is an operation flowchart of the imaging device of a fourth embodiment for camera-shake detection.

First, once the imaging device is turned on, the coarse offset adjustment is performed in Step S11. Then, the fine offset adjustment is performed in Step S31. The coarse offset adjustment in Step S11 is the same as that in the second embodiment. When the configuration shown in FIG. 4 is adopted, and when the fourth embodiment is applied to the second embodiment, the fine offset adjustment consisting of Steps S12 to S15 in FIG. 9 is performed in Step S31. Meanwhile, when the configuration in FIG. 13 is adopted, and when the fourth embodiment is applied to the third embodiment, the fine offset adjustment consisting of Steps S12 to S14 and S25 in FIG. 14 is performed in Step S31.

For example, if the half-pressing of shutter button 17a is not detected, the coarse offset adjustment in Step S11 and the fine offset adjustment in Step S31 are alternately and periodically performed via Steps S32 and S33.

Meanwhile, when the half-pressing of shutter button 17a is detected, the fine offset adjustment in Step S31 is immediately performed no matter what step has been reached in the process. Even in the middle of performing the coarse offset adjustment in Step S11, the fine offset adjustment in Step 31 immediately commences when the half-pressing of shutter button 17a is detected. Furthermore, even when the fine offset adjustment in Step S31 is terminated, the fine offset adjustment in Step S31 is repeatedly performed as long as shutter button 17a continues to be half pressed (Step S32).

When shutter button 17a is released from being half pressed, i.e., when shutter button 17a is continuously fully pressed after being half-pressed, or when a pressure is no longer applied on shutter button 17a, the process returns to Step S11 via Step S33.

When shutter button 17a is fully pressed while or immediately after the coarse offset adjustment is performed, a small offset adjustment error is superimposed on an angular velocity detected during the most significant exposure period. Considering this, the processes are performed in the above-described manner. As a result, when a still image requiring higher detection accuracy is captured, it is possible to detect the angular velocity with higher accuracy.

(Variation and the Like)

Comments 1 to 4 provided below provide variation examples or comments for the above-described embodiments. The contents of each Comment can be arbitrarily combined unless inconsistency occurs.

[Comment 1]

Specific values in the above description are merely for exemplification, and those values can be surely changed.

[Comment 2]

Examples have been described above in which camera-shake detecting unit 18 is configured of angular velocity sensors; however, camera-shake detecting unit 18 may be configured of an acceleration sensor for detecting an acceleration of the imaging device, and an angular velocity sensor for detecting an angular velocity thereof. In this case, a sensor signal provided to differential amplifier 41 in each embodiment is a signal representing the acceleration or angular velocity of the imaging device. Alternatively, the camera-shake detecting unit 18 may be configured of a sensor which detects another physical quantity representing shake of the imaging device. In this case, the sensor signal provided to differential amplifier 41 in each embodiment is a signal representing this physical quantity.

[Comment 3]

Furthermore the imaging device can be configured of hardware, or of a combination of hardware and software. Especially, the functions of main controller 13 in FIG. 1, CPU 45 in FIGS. 4 and 13, and camera-shake-information generating unit 46 or 46a in FIG. 4 or FIG. 13 can be implemented by the hardware, software, or the combination of hardware and software.

When the imaging device is configured using software, a block diagram of a portion implemented by the software is supposed to represent a functional block diagram of the portion. In addition, all or part of functions implemented by main controller 13 in FIG. 1, CPU 45 in FIGS. 4 and 13, and camera-shake-information generating unit 46 or 46a in FIG. 4 or FIG. 13 are described in a program, and the program is executed by a program-executing device (e.g. a computer) so that all or part of the functions may be implemented.

[Comment 4]

In the above-described embodiments, for example, main controller 13 may serve as detection control means, and may include CPU 45 and camera-shake-information generating unit (46 or 46a). CPU 45 also has, for example, a function as mode switching means. A shake detecting apparatus is configured so that the shake detecting apparatus includes all or part of the portions shown in FIG. 4, or includes all or part of the portions shown in FIG. 13.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced as the invention.

What is claimed is:

1. A shake detecting apparatus, comprising:
    an amplifying unit configured to amplify a difference signal between an offset signal and a sensor signal in accordance with shake of an imaging device, the amplifying unit amplifies the difference signal, based on an amplification factor signal, in any mode of a first amplification factor mode in which the difference signal is amplified at a first amplification factor, and a second amplification factor mode in which the difference signal is amplified at a second amplification factor smaller than the first amplification factor, and the amplifying unit outputs the difference signal amplified at the first amplification factor or the second amplification factor;
    an A/D converter configured to convert the difference signal from the amplifying unit into a digital signal;
    a shake-information generating unit configured to generate shake information representing the shake of the imaging device based on the digital signal;
    a controller configured to receive the digital signal for variably setting a digital offset signal based on the digital signal, and to generate the amplification factor signal;
    an offset outputting unit configured to output the digital offset signal set by the controller; and
    a D/A converter configured to convert the digital offset signal outputted from the offset outputting unit into the offset signal, and to output the offset signal to the amplifying unit,
    wherein the controller updates the offset signal based on the digital signal obtained in the second mode, and generates the shake information based on the digital signal obtained in the first mode.

2. The shake detecting apparatus as claimed in claim 1, wherein the controller repeats a process that includes updating the offset signal based on the digital signal obtained in the second mode, and generating the shake information based on the digital signal obtained in the first mode.

3. The shake detecting apparatus as claimed in claim 1, wherein the controller updates the offset signal based on the digital signal obtained in the first mode.

4. The shake detecting apparatus as claimed in claim 3, wherein
    the imaging device includes a shutter operation unit operable in two stages of a first stage operation and a second stage operation, and captures an image when the second stage operation is performed after the first stage operation, and
    the controller suspends the operation in the second mode until the second stage operation is performed after the first stage operation is performed, and updates the offset signal on the basis of the digital signal obtained in the first mode.

5. The shake detecting apparatus as claimed in claim 1, wherein the controller generates the shake information based on a difference signal between the digital signal obtained in the first mode and a second offset signal that is variably set, and updates the second offset signal on the basis of the digital signal obtained in the first mode.

6. The shake detecting apparatus as claimed in claim 5, wherein
the imaging device includes a shutter operation unit operable in two stages of: a first stage operation and; a second stage operation, and captures an image when the second stage operation is performed after the first stage operation; and
the controller suspends the operation in the second mode until the second stage operation is performed following the first stage operation, and updates the second offset signal on the basis of the digital signal obtained in the first mode.

7. The shake detecting apparatus as claimed in claim 1, further comprising an imaging unit configured to capture an image.

8. A shake detecting method, comprising:
amplifying a difference signal between an offset signal and a sensor signal in accordance with shake of an imaging device, wherein the difference signal is amplified, based on an amplification factor signal, in any mode of a first amplification factor mode in which the difference signal is amplified at a first amplification factor, and a second amplification factor mode in which the difference signal is amplified at a second amplification factor smaller than the first amplification factor;
outputting the difference signal amplified at the first amplification factor or the second amplification factor;
converting the difference signal into a digital signal;
generating shake information representing the shake of the imaging device based on the digital signal;
generating a digital offset signal based on the digital signal;
generating the amplification factor signal based on the digital signal;
converting the digital offset signal into the offset signal; and
wherein the offset signal is updated based on the digital signal obtained in the second mode, and the shake information is generated based on the digital signal obtained in the first mode.

9. The shake detecting method as claimed in claim 8, wherein a process that includes updating the offset signal based on the digital signal obtained in the second mode, and generating the shake information based on the digital signal obtained in the first mode is repeated.

10. The shake detecting method as claimed in claim 8, further comprising the step of updating the offset signal based on the digital signal obtained in the first mode.

11. The shake detecting method as claimed in claim 10, further comprising:
capturing an image when a second stage operation is performed after a first stage operation, wherein two stages of operation includes a first stage operation and a second stage operation;
suspending the operation in the second mode until the second stage operation is performed after the first stage operation is performed; and
updating the offset signal based on the digital signal obtained in the first mode.

12. The shake detecting method as claimed in claim 8, further comprising the steps of:
generating the shake information based on a difference signal between the digital signal obtained in the first mode and the offset signal; and
updating the offset signal based on the digital signal obtained in the first mode.

13. The shake detecting method as claimed in claim 12, wherein
capturing an image when a second stage operation is performed after a first stage operation, wherein two stages of operation includes a first stage operation and a second stage operation;
suspending the operation in the second mode until the second stage operation is performed following the first stage operation; and
updating the second offset signal based on the digital signal obtained in the first mode.

* * * * *